United States Patent [19]

Konotchick

[11] Patent Number: 5,818,132
[45] Date of Patent: Oct. 6, 1998

[54] LINEAR MOTION ELECTRIC POWER GENERATOR

[76] Inventor: John A. Konotchick, 3116 Mercer La., San Diego, Calif. 92122

[21] Appl. No.: 782,620

[22] Filed: Jan. 13, 1997

[51] Int. Cl.$^6$ ................................................. H02K 35/02
[52] U.S. Cl. ................................. 310/17; 290/1 R; 310/12
[58] Field of Search ................................. 310/12, 15, 17, 310/23, 24, 30, 34, 35; 290/1 R, 42

[56] References Cited

U.S. PATENT DOCUMENTS

| | | | |
|---|---|---|---|
| 4,510,420 | 4/1985 | Sasso | 310/24 X |
| 5,233,895 | 8/1993 | Coneski et al. | 83/575 |
| 5,295,031 | 3/1994 | Wasson | 360/106 |
| 5,347,186 | 9/1994 | Konotchick | 310/17 |
| 5,578,877 | 11/1996 | Tiemann | 310/15 |

*Primary Examiner*—Steven L. Stephan
*Assistant Examiner*—Judson H. Jones
*Attorney, Agent, or Firm*—John R. Ross; John R. Ross, III

[57] ABSTRACT

A linear motion electric power generator for generating electric current from work done by an intermittent force. A moving magnet is confined so that it can move with bi-directional linear, or approximately linear, motion through each of at least two coils. The coils are spaced apart from each other and connected electrically so that current produced in a first coil as a result of movement of the moving magnet is substantially in phase with current produced in said second coil. Preferred embodiments are described for providing electric power generation from extremely lower power mechanical forces. Embodiments of the invention are useful for providing power for long life flashlights, for alarm systems and for communication devices located at places where conventional electric power sources are unavailable. Another preferred embodiment is a low profile unit which derives its mechanical from repetitive forces such as the forces on the heel of a shoe during walking or running.

27 Claims, 12 Drawing Sheets

POSITION  -2 -1 0 1 2

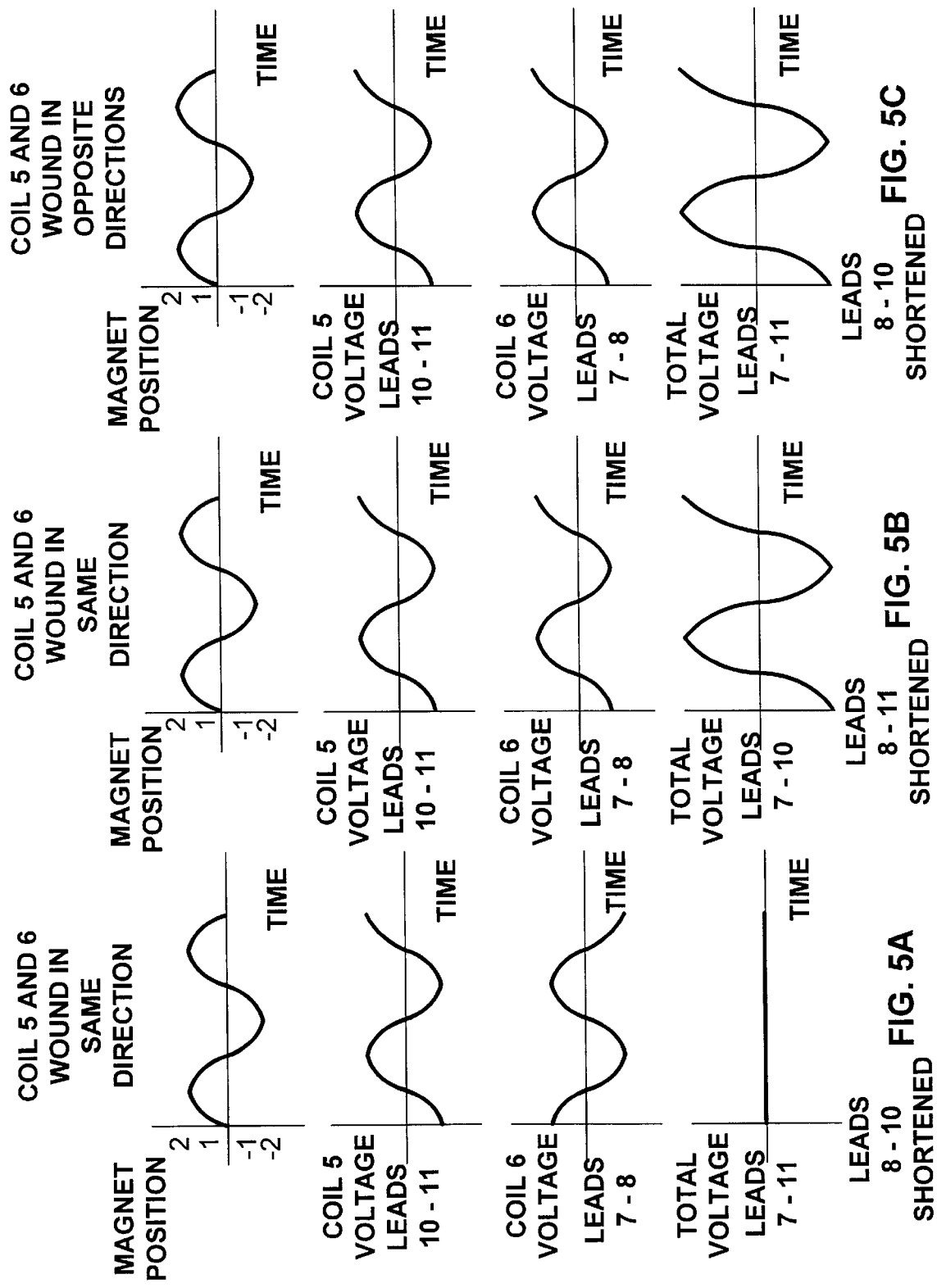

LINEAR MOTION ELECTRIC POWER GENERATOR

This invention relates to electric power generators and in particular to linear motion electric power generators.

BACKGROUND OF THE INVENTION

U.S. Pat. No. 5,347,186 was issued to Applicant on Sep. 13, 1994. This patent disclosed an electric power generator for converting linear mechanical motion into electric power. The disclosed device was designed for use with rare earth magnets and with relatively high power linear mechanical motion such as that associated with ocean wave action and human joggers. These rare earth magnets are expensive when compared with ceramic disk magnets.

Situations currently exist where very low power mechanical motion is available which could satisfy a need for small amounts of remote electric power.

What is needed is an improved linear motion electric power generator capable of converting very low power linear mechanical motion into electric power.

SUMMARY OF THE INVENTION

The present invention provides a linear motion electric power generator for generating electric current from work done by an intermittent force. A moving magnet is confined so that it can move with bi-directional linear, or approximately linear, motion through each of at least two coils. The coils are spaced apart from each other and connected electrically so that current produced in a first coil as a result of movement of the moving magnet is substantially in phase with current produced in said second coil. Preferred embodiments are described for providing electric power generation from extremely low power mechanical forces. Embodiments of the invention are useful for providing power for long life flashlights, for alarm systems and for communication devices located at places where conventional electric power sources are unavailable. Another preferred embodiment is a low profile unit which generates electric power from relatively high power repetitive forces such as the forces on the heel of a shoe during walking or running.

BRIEF DESCRIPTION OF THE DRAWINGS

FIG. 5A, 5B and 5C are graphs explaining the importance of the coils being arranged so that current produced in each of them is in phase.

DETAILED DESCRIPTION OF PREFERRED EMBODIMENTS

Preferred embodiments of the present invention are described below by reference to the drawings.

PREFERRED LINEAR MOTION GENERATORS

First Embodiment

Figure 1:
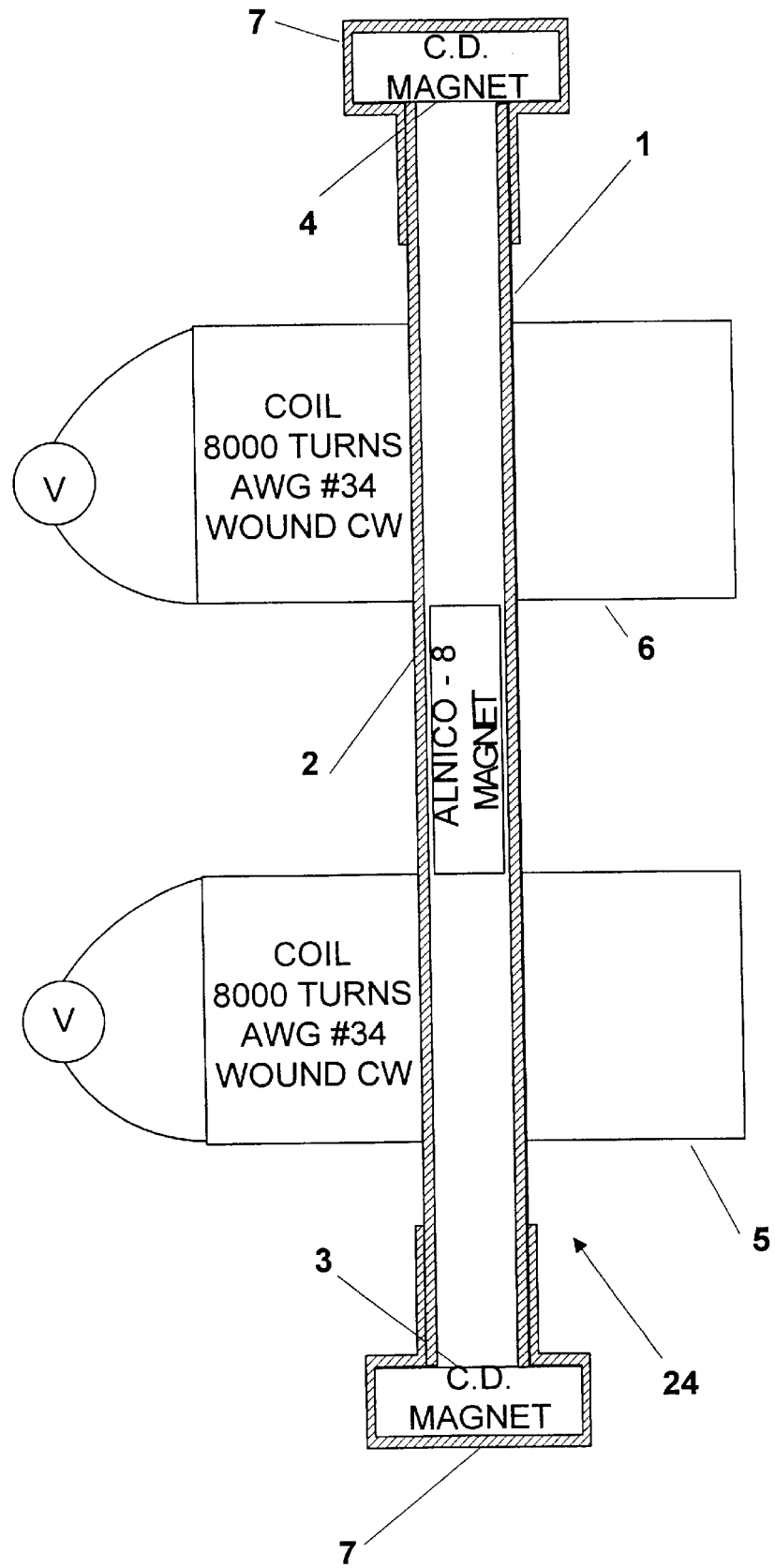
FIG. 1 is a drawing of an embodiment describing some of the features of the present invention.

A first embodiment of the present invention is shown in FIG. 1. An electric generating unit 24 comprises brass tube 1 having a wall thickness of 0.014 inch, an outside diameter of $^{17}/_{32}$ inch and a length of 4 inches. Tube 1 should be non-ferrous. A variety of tube materials were successfully used in models, including: acrylic, glass, brass, garolite, and teflon. Almost any tube nonferrous material can be used. Thin walled brass became the material of choice for most applications. Magnet 2 is a rod magnet comprised of Alnico-8 material with a diameter of 0.5 inch and a length of 0.75 inch. The unit comprises two coils 5 and 6 with 8,000 turns of AWG #34 transformer wire each. Coils 5 and 6 were each 0.75 inches long. They are bound with Acrylic cement and centered on the tube with a separation of 0.75 inch between them. End magnets 3 and 4 were inexpensive ceramic disc magnets of a diameter of 1 inch and a thickness of 0.25 inch. End magnets are in polar opposition to magnet 2 so as to suspend magnet 2 by repulsive magnetic force. The end magnets are glued in place at each end of tube 1 by the use of a hot glue gun. Duct tape 7 is then wrapped around the outside of the end magnets 3 and 4 for durability. Moderate up and down motion of unit 24 caused a peak to peak voltage from each coil of about 5 volts across oscilloscope leads (open circuited).

The first embodiment utilizes a solid moving magnet 2. The moving magnet is the only moving part in this power generator. Its movement through the coils outside of tube generates the useful power of the device. To be effective, it should move freely in the tube, and have good magnetic strength, i.e., many magnetic flux lines through the coils. It should also retain its magnetic strength over the life of the unit, or to state it another way, its retention of magnetic strength essentially determines the life of the unit. Rare earth magnets are the best magnetic materials for both providing strong fields and for providing long lifetimes (e.g., 100 years might be expected). Rare earth magnets, however, are expensive, especially in larger sizes, or in shapes required for this application. The magnet shapes required for this application need to have a length longer than their diameter to prevent the magnet from turning or flipping over within the tube. This rod-shaped magnet is more expensive than the common disc magnet shape. Alnico 5, or Alnico 8 magnets also have long lifetimes and work suitably well for many application. Either type in a rod configuration, however, is expensive in comparison to the same diameter units in shorter length disc configurations. Increasing the magnets length does little to increase its strength, once a certain length (usually a thin disc size) has been reached.

Second Embodiment

A second embodiment was designed to minimize the expense associated with a solid rare earth or Alnico moving magnet 2. It was found that by attaching inexpensive ceramic magnets of the same diameter to the ends of more powerful Alnico or Rare earth magnets we could achieve the desired rod shape with greatly reduced costs. These magnet sandwiches make use of powerful but inexpensive thin disc magnets of rare earth or other strong magnets in the center, with inexpensive end magnets of ceramic or some other very inexpensive material. A magnetically conductive material could also be used in place of the ceramic magnets. The holding power of the central magnet firmly binds the sandwich in place without adhesive, although, adhesive could be used if desired. This configuration also provides a flexible and efficient way of tailoring the moving magnet's length to fit the coil length for optimum efficiency.

Figure 2:
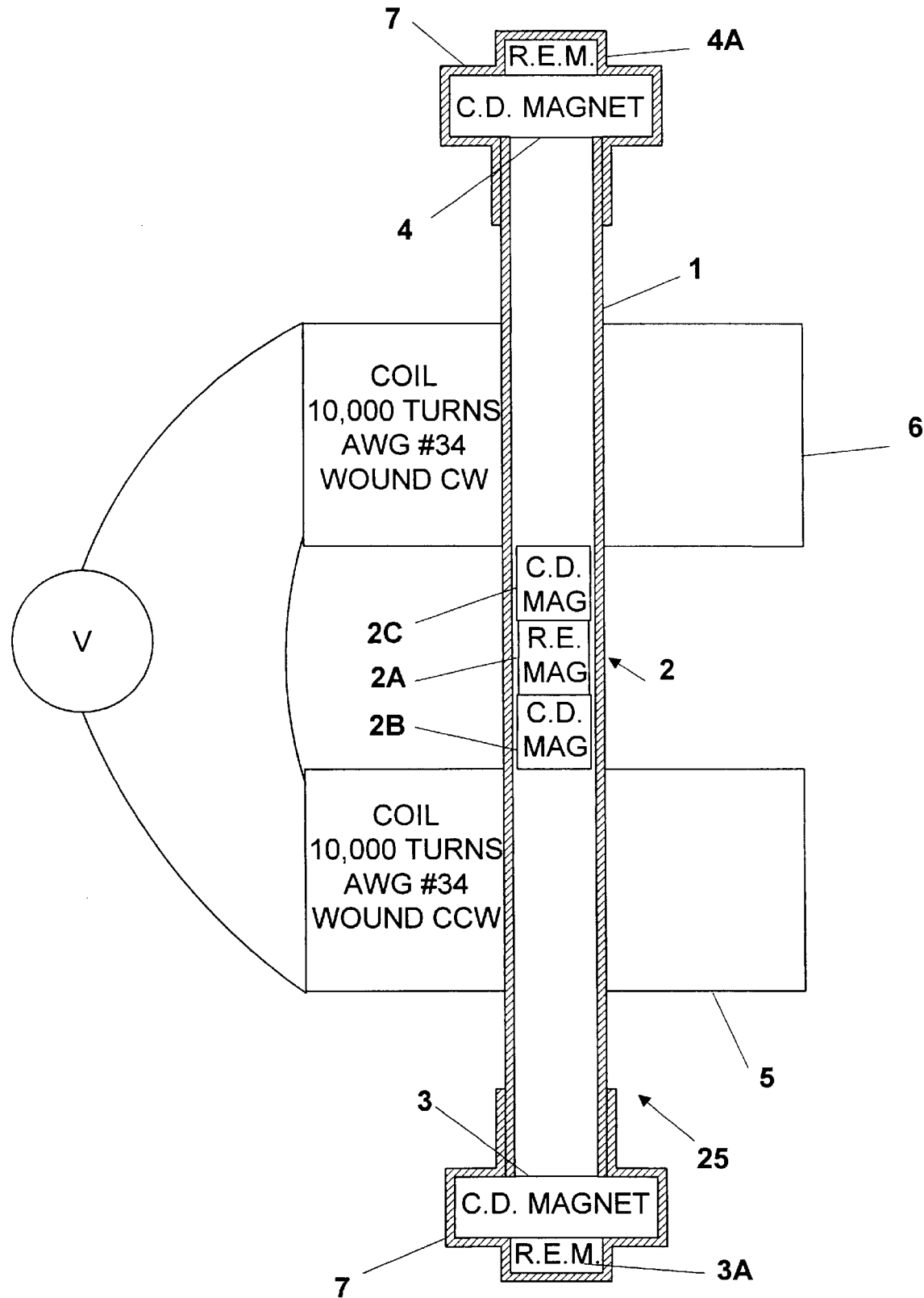
FIGS. 2 and 3 are drawings of preferred embodiments of the present invention.

The second embodiment is shown in FIG. 2. Electric generating unit 25 comprises brass tube 1 having a wall thickness of 0.014 inch, an outside diameter of $17/32$ inch and a length of 5 inches. Brass tube 1 is available from the McMaster-Carr mail order catalog. Moving magnet 2 is composed of three small disc magnets 2A, 2B, and 2C held together by magnetic force. Center disc magnet 2A is a rare earth Neodymium-Iron-Boron magnets of 0.37 inch diameter and 0.25 inch in length, available from Permag Corp., with offices in Fremont, Calif. (for about $9 in small quantities). Magnets 2B and 2C are inexpensive and commonly available ceramic disc magnets of diameter 0.375 inch and length of 0.25 inch. The unit comprises two coils 5 and 6 with 10,000 turns of AWG #38 or AWG #34 (drawing shows AWG #34) transformer wire each. Coils 5 and 6 were each 0.75 inches long and were wound in opposite directions (i.e., one CW and one CCW). They are bound with Acrylic cement and centered on the tube with a separation of 0.75 inch between them. End magnets 3 and 4 were inexpensive ceramic disc magnets of a diameter of 1 inch and a thickness of 0.25 inch. They were glued in place at each end of tube 1 by the use of a hot glue gun. On the outside of end magnets 3 and 4, rare earth disk magnets 3A and 4A were attached to ensure long life of the end magnets. Magnets 3A and 4A are $1/8$ inch thick and $1/4$ inch in diameter. Duct tape 7 is then wrapped around the outside of the end magnets 3 and 4 for durability. Very mild shaking of unit 25 caused a peak to peak voltage of about 3 volts across oscilloscope leads (open circuited). Heavy shaking produced a peak to peak voltage of 20 volts. The combined coil resistance of this combination of oppositely wound coils was 2,850 ohms. Therefore, it delivered about 17.5 milliwatts of electrical power into a 2,850 ohm load with heavy shaking.

In addition to modifying the design for moving magnet 2, the second embodiment also provides for a method of increasing the strength of end magnets 3 and 4 by attaching rare earth magnets 3A and 4A. For sensitive units, inexpensive ceramic magnets can provide sufficient springless holding forces on the central, moving, magnet. These ceramic magnets, however while inexpensive have a tendency to lose their magnetic strength over time. Rare earth magnets conversely are comparatively expensive, but have excellent magnetic lifetimes. A means to take advantage of the lower costs of these ceramic magnets for use as end magnets is to attach a very small, and consequently inexpensive rare earth magnet to the outside of the ceramic magnets. Very low cost end magnets are thereby possible while retaining essentially permanent magnetization.

Another option would be to provide cushioning material between end magnets 3 and 4 and moving magnet 2. The end magnets provide a springless means of suspending the central, moving, magnet in the tube. They can be made the same size as the inside diameter of the tube, or slightly smaller, and cemented in place, inside the tube at the ends. A preferred embodiment, however, uses end magnets slightly larger than the diameter of the tube. These larger magnets make assembly much easier, and permit cushioning material to be used between the tube and the end magnets. This cushioning material would be useful when weak end magnets are used for sensitivity, but occasional extreme G-force impacts might be encountered which might otherwise cause the moving magnet to impact the end magnets and damage them.

Finally, the second embodiment utilizes a longer tube 1. The length of tube 1 can directly affect the sensitivity of the unit. If strong end magnets are used, a short tube will cause the central, moving, magnet to be held strongly in the center. A longer tube with the same end magnets will present a weaker holding force on the central magnet, causing it to be more sensitive to motion along its axis.

Third Embodiment

A third embodiment utilizes a tube 1 with a larger diameter. In early embodiments tubes only slightly larger than the magnet diameter were used to minimize size of the units. When this was done, it became necessary to notch the ends of the tubes to permit air to circulate. Holes drilled in the tubes along its length were also used on some models to minimize this damping effect, although, coil placement will tend to close off some of these breathing holes. Without the notched ends, or breathing holes in the tube, the motion of the moving magnet would become damped from lack of air flow, like the piston in a cylinder. The preferred embodiment, however, is to chose a tube diameter sufficiently larger than the magnet diameter to permit good air flow around the magnet, so as not to cause air damping of the magnet's motion.

Figure 3:
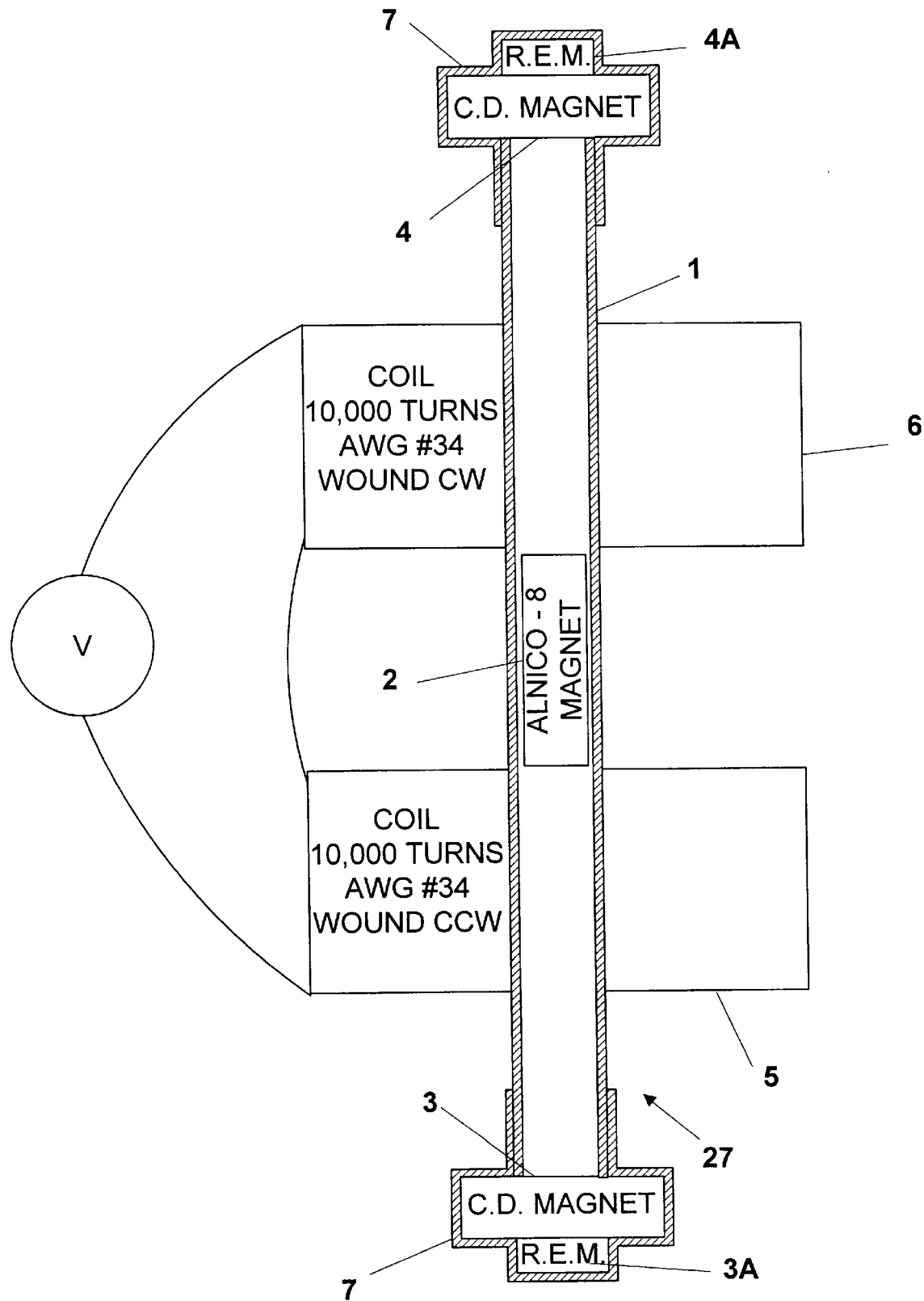
Figure 4:
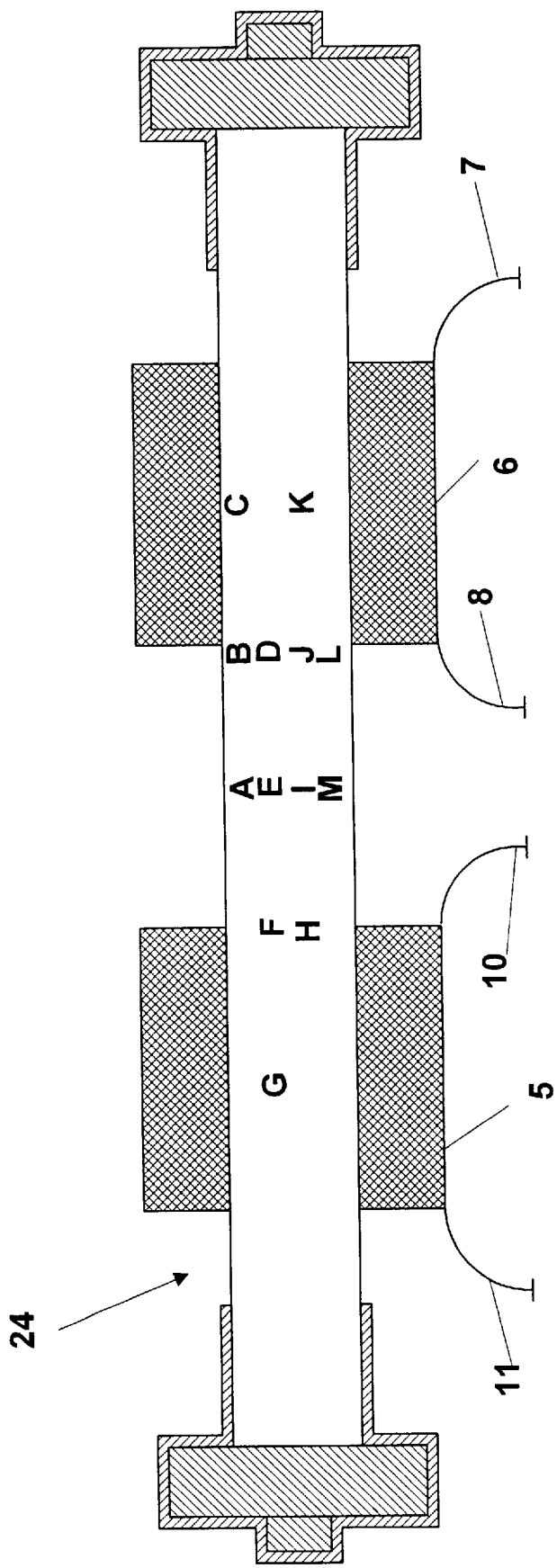
FIG. 4A through 4M show views of a preferred embodiment with a moving magnet is various positions.
Figure 4A:
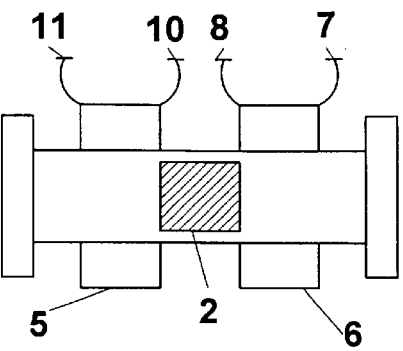
Figure 4G:
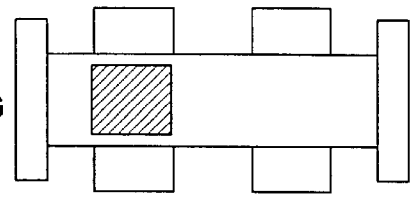
Figure 4B:
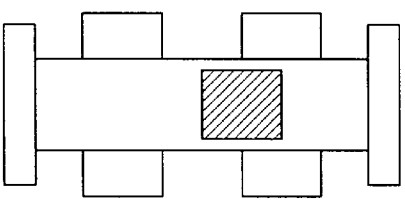
Figure 4H:
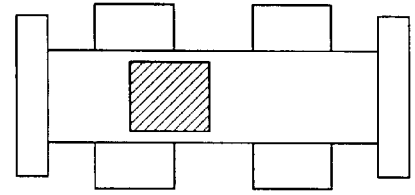
Figure 4C:
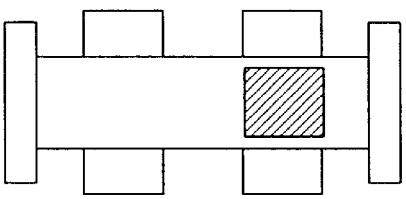
Figure 4I:
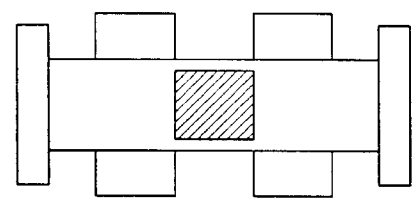
Figure 4D:
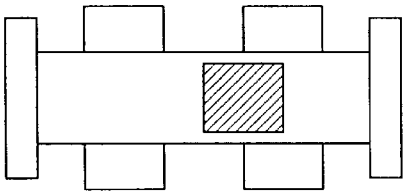
Figure 4J:
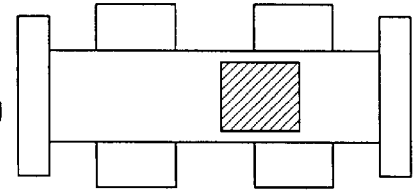
Figure 4E:
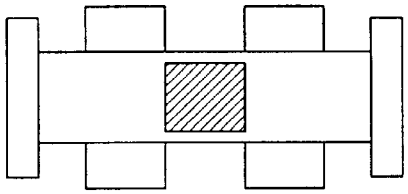
Figure 4K:
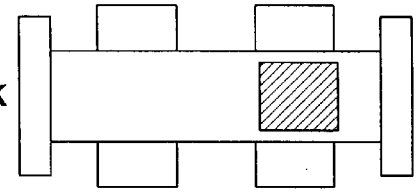
Figure 4F:
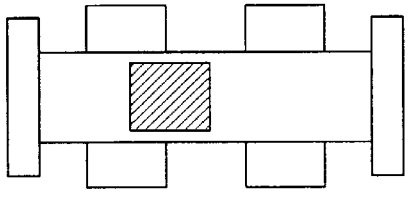
Figure 4L:
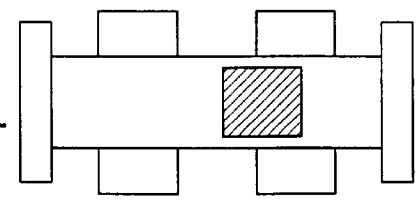
Figure 4M:
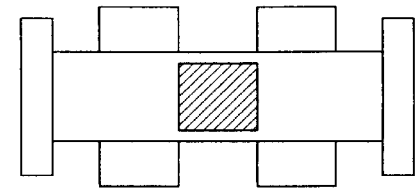

A third embodiment is shown in FIG. 3. Electric generating unit 27 comprises brass tube 1 having a wall thickness of 0.014 inch, an outside diameter of $9/16$ inch and a length of 5 inches. Moving magnet 2 is an Alnico 8 rod magnet of 0.5 inch in diameter and 1 inch long. All other aspects of the third embodiment are identical to those aspects described in the second embodiment. Very mild shaking of unit 27 caused a peak to peak voltage of about 3 volts across oscilloscope leads (open circuited). Heavy shaking produced a peak to peak voltage of 20 volts. The combined coil resistance of this combination of oppositely wound coils was 2,850 ohms. Therefore, it delivered about 17.5 milliwatts of electrical power into a 2,850 ohm load with heavy shaking.

DESIGN VARIATIONS

Coil Direction

As generating unit 24 moves up and down, moving magnet 2 oscillates between coils 5 and 6. The movement of moving magnet 2 is illustrated in FIGS. 4A–4M. Letters A through M represent the position of the center of moving magnet 2 as it oscillates through one and one-half cycles. As moving magnet 2 moves in relation to coils 5 and 6, voltage is generated through the coils.

Voltage as a function of time and magnet position is illustrated graphically in FIGS. 5A and 5B. If coil 5 is wound in the same direction as coil 6, the voltage read between coil 6 ends 7 and 8 and the voltage read between coil 5 ends 10 and 11 will be out of phase. This is because as magnet 2 is leaving coil 5 in the direction of coil 6, it will cause a signal to be generated in coils 5 and 6 to oppose the move. The resultant current will be in opposite directions in each coil. Therefore a short circuit between coil end 8 and coil end 10 would result in a very small voltage measurement across coil ends 7 to 11 because the two signals would largely cancel one another, as shown in FIG. 5A. If, however, the coil ends were reversed, so that coil end 8 were connected to coil end 11 and voltage was read across coil ends 7 and 10, the signals would be in phase and add, as shown in FIG. 5B.

In the preferred embodiment, an identical effect is achieved by first winding coil 5 clockwise and then extending the same piece of wire and winding coil 6 counter clockwise. The effect is shown in FIG. 5C. This saves a significant step in manufacture because the short circuit required between coil end 8 and coil end 10 is automatically created when both coils 5 and 6 are created from the same wire.

Multiple Units in Parallel

Figure 6:
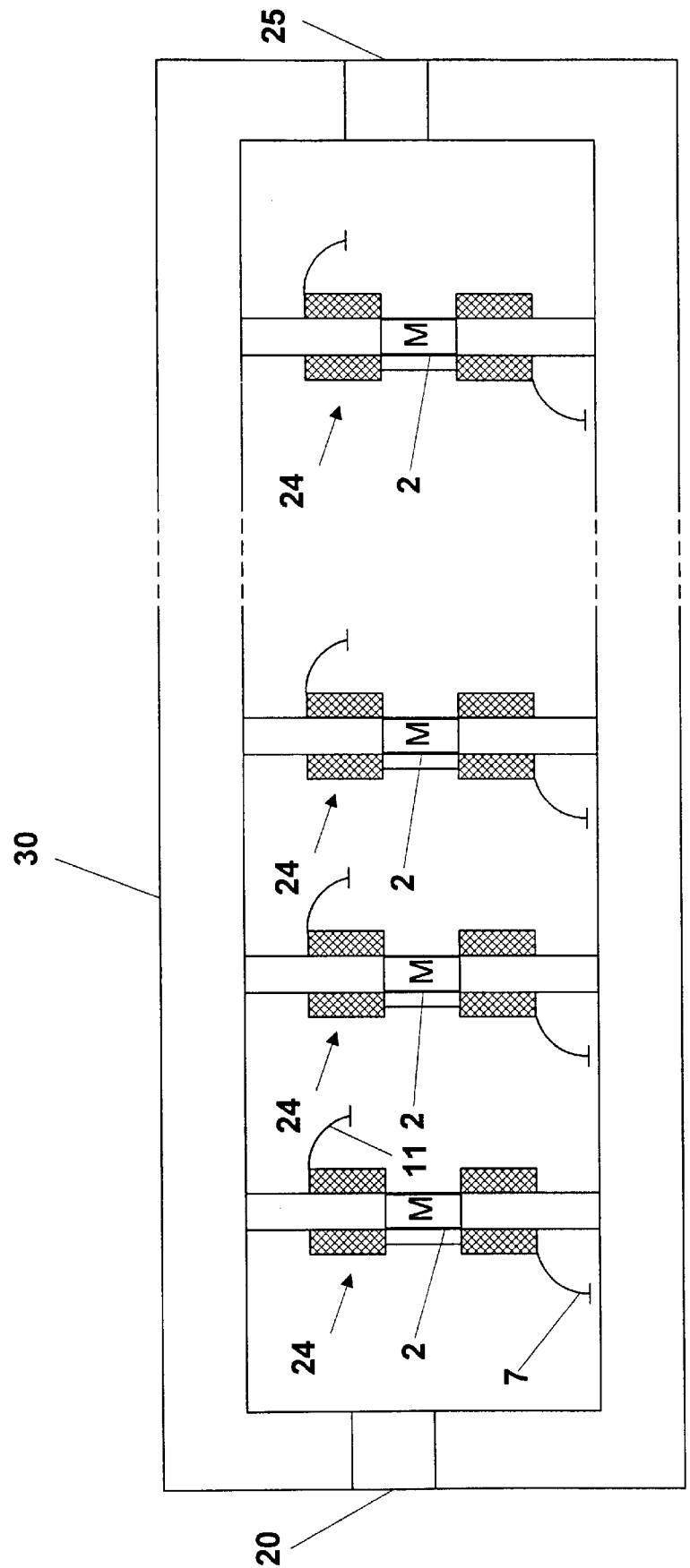
FIG. 6 shows an embodiment with several generators mounted in a single magnetic housing.

In one preferred embodiment, power output from the linear motion electric power generator is increased by placing several electric generating units 24 in parallel. In this embodiment, end magnets 3 and 4 are replaced by a magnetically conductive housing 30, as shown in FIG. 6. Housing 30 is magnetized by two magnets 20 and 25 so that the ends of housing 30 are in polar opposition to moving magnet 2. The coils of each generating unit 24 are wound clockwise and counter-clockwise as shown in FIGS. 2 and 3. Each generating unit 24 has two coil ends 7 and 11. Coil ends 7 and 11 of each generating unit 24 can now be connected in parallel to one another so as to achieve a greater current output, or in series for greater voltage output. The output power is equivalent to the output power of one generating unit 24 multiplied by the total number of generating units in housing 30.

Multiple Moving Magnets

Figure 7:
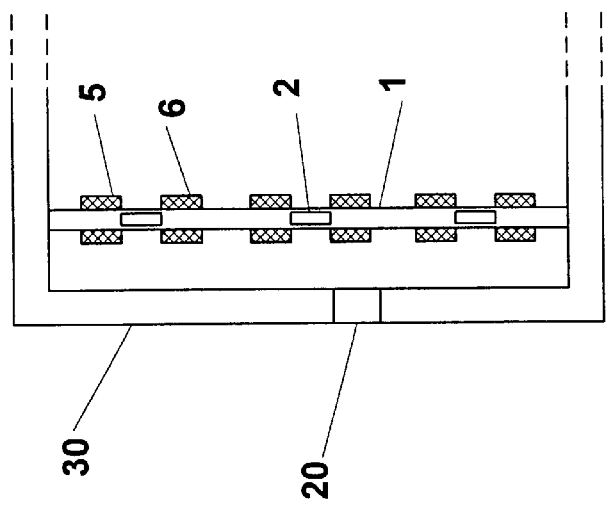
FIG. 7 shows an embodiment with multiple moving magnets.

In another embodiment, power output can be increased by increasing the number of moving magnets 2 in tube 1, as shown in FIG. 7. FIG. 7 shows three moving magnets 2, but any odd number could be used. For each moving magnet 2, there are corresponding coils 5 and 6. The outputs from these coils can again be connected in series or parallel for desired performance.

Reduction of Air Damping

The moving magnet can be damped by air pressure in either side of it within the tube, if it has too little clearance with the inside of the tube. A number of tube modifications can help prevent this and were discussed above under the tube design paragraphs. The magnet shape can also mitigate this effect also. If magnets are used which have relatively large clearances between their diameter and the inside diameter of the tube, air will be free to move easily around the magnet. Similarly, if the magnets have holes in them, such as stacks of the common toroidal magnets, air will be free to pass through them and not damp the magnet's movement. In summary, there are several ways to reduce air damping:

(1) Notches are cut into the end of tube 1 to permit the escape of air as moving magnet 2 approaches end magnet 3 or 4.

(2) Holes are drilled into tube 1 along its length to permit the escape of air as moving magnet 2 approaches end magnet 3 or 4.

(3) Tube 1 is used so its diameter may be sufficiently larger than the diameter of moving magnet 2 so as to permit good air flow around magnet 2 or the magnet can be fabricated with outside grooves or a hole in it to permit air flow through it or beside it.

Enhancing Sensitivity

The sensitivity of unit 24 can be significantly increased by orientating unit 24 in a vertical position because when unit 24 is in a vertical position, the friction between moving magnet 2 and tube 1 is minimized. By using weak end magnets 3 and 4 and/or a long tube 1 to reduce the stabilizing force end magnets 3 and 4 induce on moving magnet 2, generating unit 24 is made even more sensitive. However, because end magnets 3 and 4 are weaker and tube 1 is longer, the stabilizing force of the bottom end magnet will have a weaker effect on moving magnet 2 which is constantly being forced downward due to gravity. Hence, the position of coils 5 and 6 may need to be adjusted to achieve maximum performance.

Figure 8:
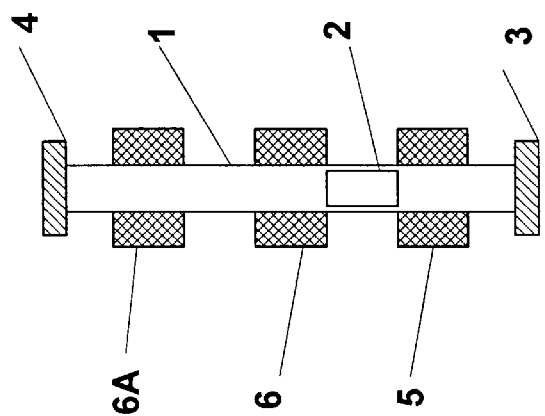
FIG. 8 shows an embodiment with three coils which may be preferred when the orientation of the unit is not known.

A three coil embodiment may be preferred for units that are sometimes orientated vertically, sometimes in the opposite vertical direction, and sometimes horizontally. Three coils 5, 6 and 6A, as shown in FIG. 8, compensate for the propensity of moving magnet 2 to fall below the center of tube 1. The three coils are wound with one in the center of tube 1, and the other 2 on either side of it, as shown in FIG. 8. In the preferred embodiment, each coil is made from the same wire and wound in opposite directions from the one adjacent to it (e.g., cw, ccw) so the wires will be properly phased for a maximum output.

Two-Coil Embodiment for Vertical Orientation

Figure 9:
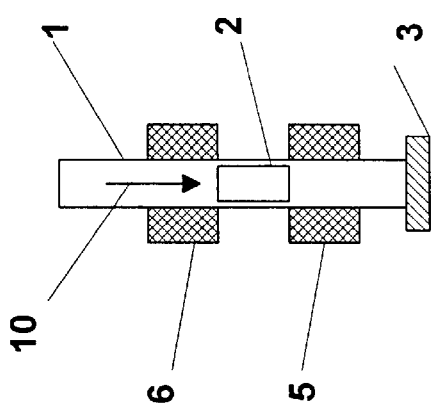
FIG. 9 shows an embodiment useful when the orientation of the unit will always be vertical.

For units that will always be in a vertical position with the same end facing down, the number of coils 5 and 6 can be reduced to just two and the number of end magnets can be reduced to just one, as shown in FIG. 9. Moving magnet 2 is held in a 'floating' position by the counter action of gravitational force 10 and magnetic force from end magnet 3.

RAIL CAR APPLICATION

Battery Charger for Satellite Communications

In a preferred application of my linear motion electric power generators that is being planned for operation, the generating units are being used to keep batteries fully charged on individual rail cars. The batteries in turn provide electric power periodically for communication via satellite between an electronics package on board the rail car and a monitoring ground station. It is desired to have an operational life of five years for these units before replacement (which is labor intensive and consequently expensive). Obtaining five year life from batteries required recharging them. Other means of recharging (e.g., solar, wind driven, etc.) were all found incapable of meeting the expected environmental conditions of these units. Prototype units as described above were placed on board rail cars and sent across the country to measure their output. They were found to be sufficient to meet the need. They did, however, need to be made more sensitive and less costly than prior art linear motion power generators, and the technology described in this disclosure has made that possible.

Figure 12:
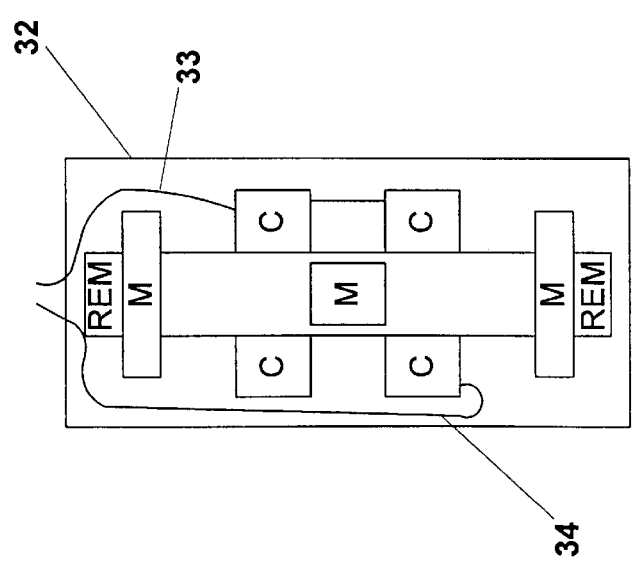
FIG. 12 shows a block drawing of a preferred embodiment designed for use on rail cars as a part of a satellite communication system.

The preferred embodiments of the units that will be used in this application are similar to the design shown in FIG. 2. They would have 10,000 turns on each of two coils of #40 wire. The coils are wound in opposite directions, and they are each about 0.75 inches long. The moving magnet is a sandwich of ceramic and rare earth magnets of about 0.375 inch in diameter, and combined length of 0.75 inches. The tubes are brass tubes as described above. The end magnets are ceramic disc magnets of about 1 inch in diameter and 0.25 thick with tiny rare earth magnets attached to the outside. The entire unit is placed inside a steel pipe 32, and hermetically sealed with only two wires 33 and 34 protruding from the unit. These units are expected to deliver about 10 milliwatts of electrical power under normal operating conditions. (See FIG. 12.)

Other Rail Designs

Figure 10:
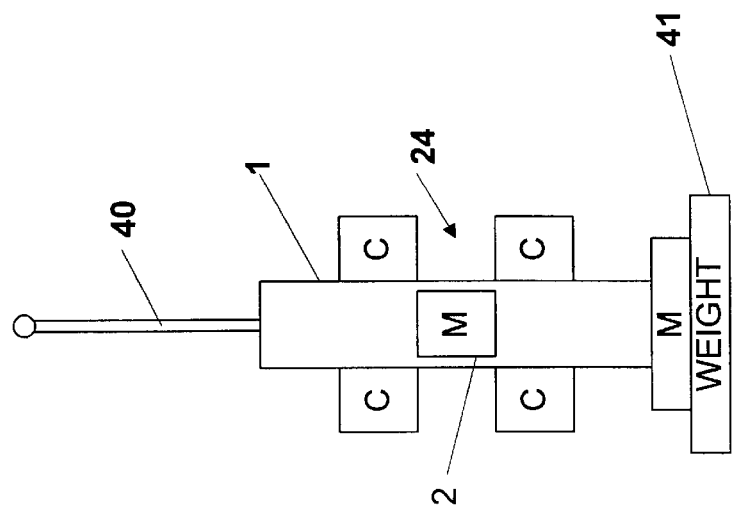
FIG. 10 shows an embodiment designed to reduce forces between the moving magnet and wall of a confining tube.

A rail car has considerable horizontal movement. However, the motion is very low frequency and therefore requires a sensitive unit to be able to take advantage of it. Generating units have maximum sensitivity when in a vertical position where magnet 2 is essentially 'floating' on the repulsive force of an end magnet. To take advantage of this orientation, unit 24 may be suspended on a rod 40 from a pivot point, as shown in FIG. 10. A weight 41 may be added at the bottom of unit 24 to help assure that horizontal forces are cancelled and to minimize horizontal forces between magnet 2 and the walls of tube 1.

Another embodiment was designed to take advantage of this orientation by using two power generator units at right angles to each other and mounted on a pivot point which allows free movement of the combined unit. A horizontally oriented unit can be mounted on a plate which is free to pivot about a point. A vertically mounted power generator unit is also mounted on the plate. An optional weight may be added to this vertically mounted unit also. As a horizontal force is applied through the pivot point (which is mounted to the body of a rail car or other horizontally moving base), it causes a rocking motion of the plate due to the inertia of the vertically mounted unit. This rocking movement tilts the horizontally mounted unit above, causing extra movement forces on it due to a tilting of the unit. The vertically mounted unit meanwhile is free to respond to any vertical force movements that may also be present.

Figure 11A:
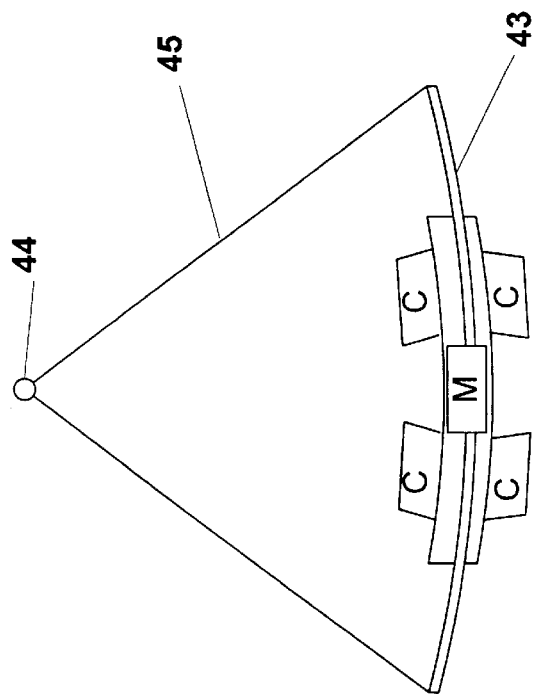
FIGS. 11A and 11B show embodiments designed to produce power from horizonal forces.
Figure 11B:
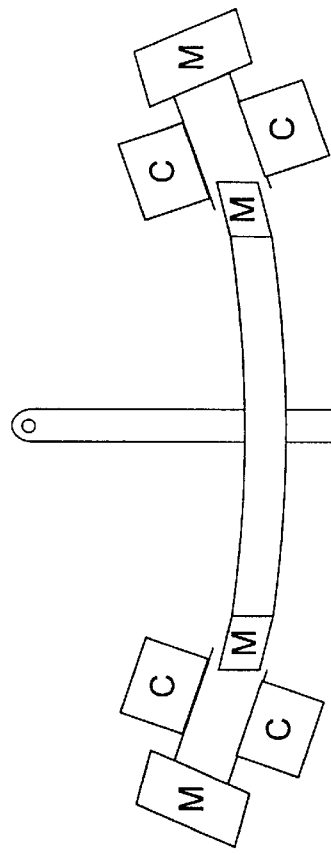

FIGS. 11A and 11B show embodiments for generating power from the horizontal forces generated by moving rail cars. In this case the tube and coils are fixed to the car and the moving magnet 2 is part of a pendulum which swings from pivot point 44 supported by cords or rods 45. In both cases the end magnets are optional

LIFETIME FLASHLIGHT

With the advent of high output LEDs it is possible to build a flashlight that will essentially last forever without replacing batteries, and that can be made much more durable than flashlights using conventional bulbs and batteries. Conventional bulbs have filaments which can break if the flashlight is dropped, and will wear out over time. This unit could power such a bulb in a flashlight, but because of the extreme lifetime of this device, LEDs provide a more durable choice of light transducer. Currently LED output light level is much lower than incandescent bulbs, but each year advances in LED technology are making them brighter. This application uses a power generator units similar to that in FIG. 2, and supplies some simple electronics to provide energy storage and controlled power to the LEDs or incandescent bulbs.

Two types of units were constructed to validate this concept, these were a simple battery-less unit using an energy storage capacitor, and a rechargeable battery unit that would be kept fully charged by the unit. With the flashlight kept in some location where mechanical movement was nominally present, such as on a small boat, in an automobile glove-compartment or trunk, in a hiker's backpack, or mounted on a bicycle; the unit would constantly be supplying power to the energy storage device. The flashlight would therefore always be fully charged when needed. These two embodiments are described below.

Capacitor Energy Storage Flashlight

Figure 13A:
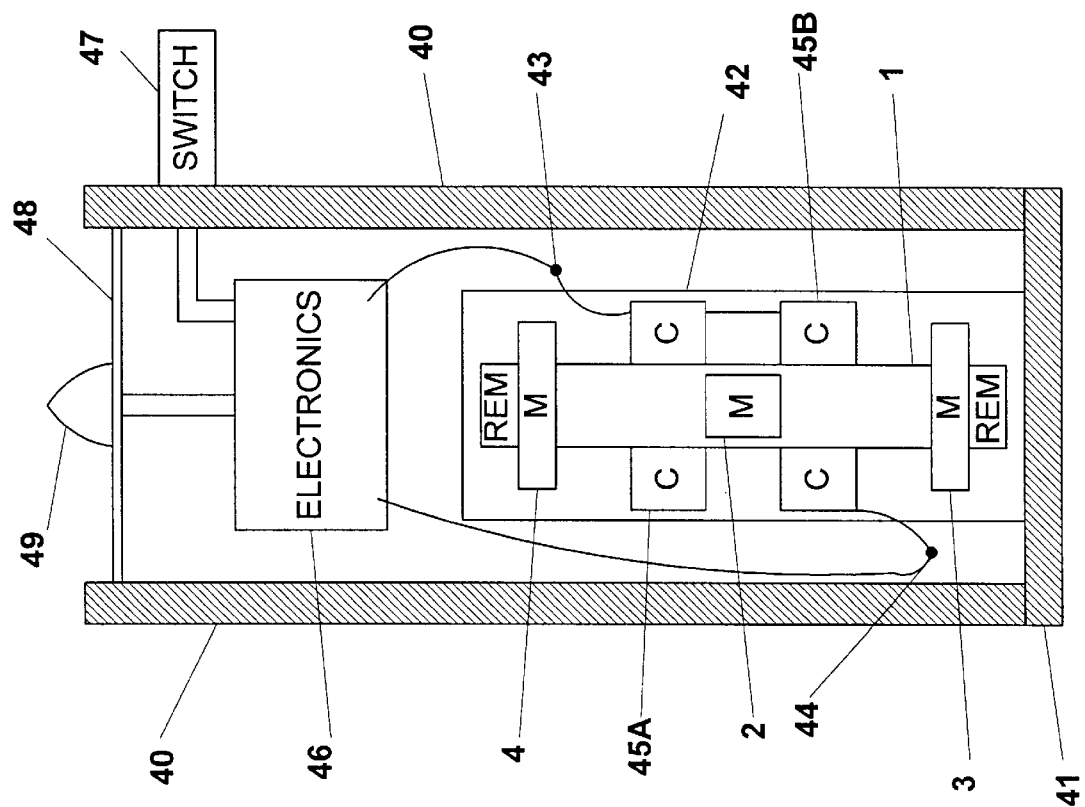
FIG. 13A is a drawing showing the principal features of a flashlight using the present invention for a power source.

FIG. 13A illustrates a preferred embodiment of the device. This unit contains a power generator unit 42 which is similar to the design in FIG. 2. In the prototype model the power generator unit 42 used a 0.5 inch O.D. brass tube 1 with a wall thickness of 0.014 inches and a length of 5 inches. On this tube were wound coils 45A and 45B which started 1.25 inches from one end using #40 magnet wire. The coil 45A was wound with 10,000 turns clockwise in a length of 0.75 inches, then separated by 1.0 inches, then coil 45B was wound 10,000 turns in a counter-clockwise direction, again with a length of 0.75 inches. Coil outside diameter was about 0.75 inches. End magnets 3 and 4 were 1-inch diameter, 0.25-inch thick inexpensive ceramic magnets with a small (0.25 inch diameter by 0.125 thick) Neodymium-Iron-Boron (NdFeB) magnets attached to the outside to provide permanent magnetization. Moving magnets 2 was a sandwich of four inexpensive 0.37 inch diameter by 0.25 thick NdFeB disc magnets.

Figure 13B:
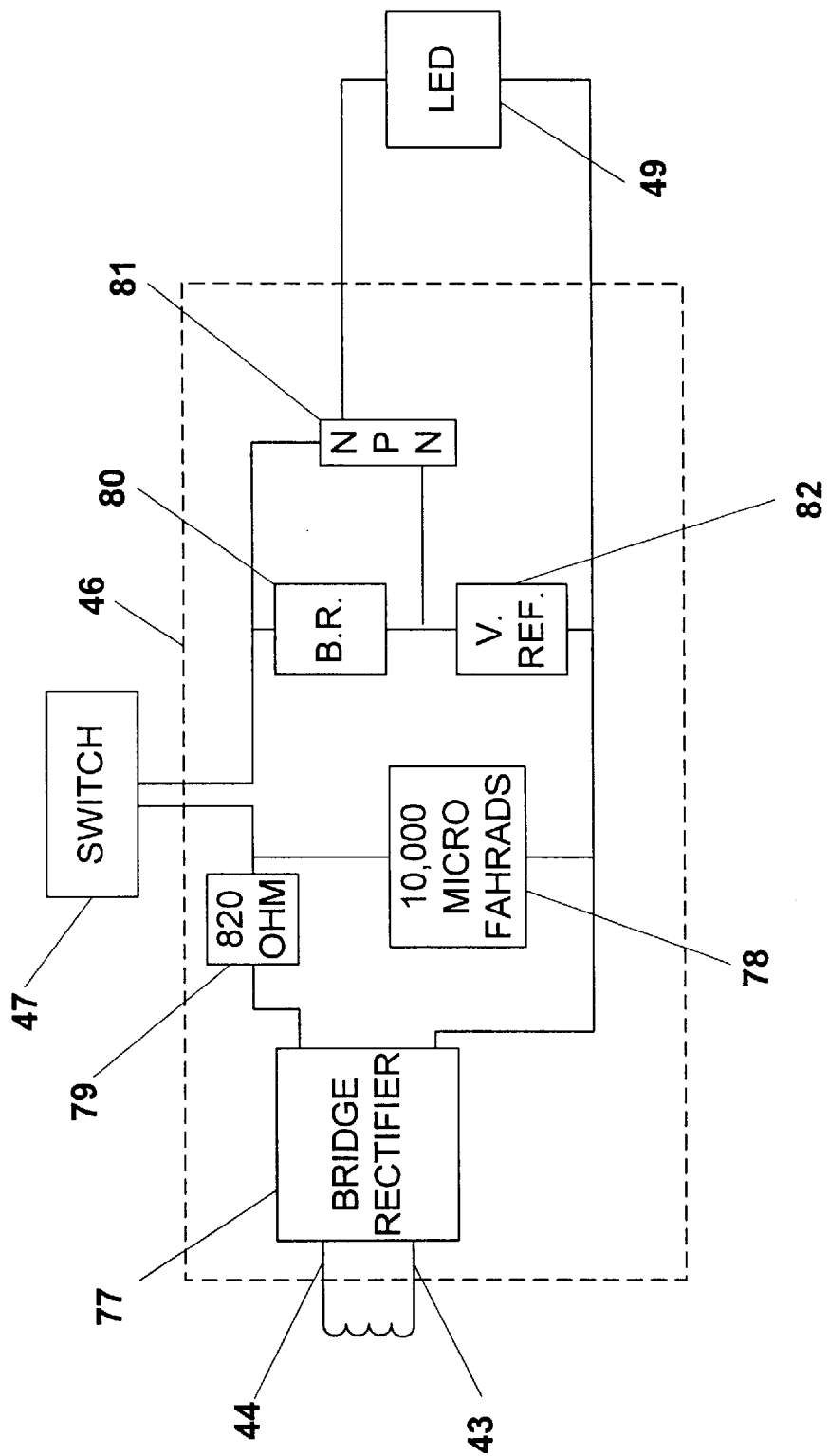
FIG. 13B describes the electronic components in a FIG. 13A flashlight.

The coil ends 43 and 44 were attached to a full-wave bridge rectifier 77 (Radio Shack #276-1152) as shown in FIG. 13B. The positive DC output of the bridge rectifier 77 was connected to a current limiting resistor 79 of 820 ohms. The other side of resistor 79 was attached both to one end of a push button switch 47 and to a 10,000 microfarad (16 Volt) energy storage capacitor 78. Movement of the power generator unit 42 provides energy to keep capacitor 78 charged. A voltage limiting zener diode could be placed across capacitor 78 to protect it but current limiting resistor 79 provides sufficient protection in this model. When push button switch 47 is closed it applies the voltage stored on capacitor 78 both to the biasing resistor 80 and to the collector of an NPN transistor 81 (Radio Shack #276-1617). The other end of biasing resistor 80 is connected to both the base of NPN transistor 81 and also to voltage reference 82. In this prototype four 1N914 silicon diodes were connected in series to provide a voltage reference 82 of approximately 2.8 V (4×0.7 V forward voltage drop), although zener diodes could also be used here. The emitter end of NPN transistor 81 was thus biased to about 2.1 volts to light LED 49. LED 49 is a high brightness, jumbo LED (Radio Shack #276-206) rated at 12,000 mcd with about 2 volts on it.

The power generator 42 and electronics 46 were housed inside a clear acrylic tube 40 with an outside diameter of 1.25 inches, a wall thickness of $\frac{1}{16}$ inch, and a length of 8 inches, as shown in FIG. 13A. The housing tube 40 had a fitted end cap termination 41 on one end, and the other end the termination 48 was white GE Silicone II Bathtub and Tile sealant.

The prototype embodiment provides a bright red light which does not destroy the eye's night vision adaptation, but yet provides enough illumination to read with or to spotlight objects across a room. Without movement the capacitor 78 provides about 10 seconds of bright illumination and about 30 seconds of faint illumination. Available capacitors, however, are available which could have quadrupled these times and still fit comfortably in housing 40. Another useful feature might be a simple potentiometer in the bias network to control light intensity.

Rechargeable Battery Energy Storage Flashlight

The capacitor energy storage 78 LED 49 combination constructed above should work as well 30 years from now as it does now. If greater illumination is required, however, one may want to use incandescent bulbs of the type used in conventional flashlights. FIG. 13A would again illustrate this concept, where bulb 49 is now an incandescent bulb, and electronics package 46 is now simplified. In FIG. 13B energy storage device 78 is now a rechargeable battery. Items 80, 81, and 82 are not required, and switch 47 can be connected directly to an incandescent bulb instead of LED 49.

I used a three cell Krypton flashlight from Radio Shack (#61-2541) as the basic structure of the flashlight in my initial embodiment, but instead of batteries, I replaced that battery area with a combination of the small battery and one of my power generator units. A 3.6 V, 280 MAH, (Radio Shack #23-171) nickel cadmium battery was used in the initial embodiment. It is 1.0 inches in diameter and 1.0 inches long. I used a 5 inch long power generator unit 42 (FIG. 13A) constructed as before. It had two coils of 10,000 turns of #40 wire oppositely wound on a $7/16$ inch diameter brass tube, and used $3/8$ inch diameter sandwich of three magnets 2. This sandwich 2 had a NdFeB central magnet and two ceramic magnets on the ends. The output leads 43, and 44 of the power generator unit 42 were connected to a full wave bridge rectifier 77(Radio Shack #276-1152). The bridge rectifier 77 and the power generator unit were sealed within a 1¼ OD clear acrylic tube using bathroom sealant and plastic end caps. Only the two DC power leads from the bridge rectifier were brought out through the seal. These output leads from the bridge rectifier 77 were then connected to the other components of the unit.

A small circular disk of ¼ inch thick wood was cut with a hole saw to make a disc about 1¼ inch in diameter. A copper bolt was placed in the center of this with a wire attachment to become the contact that mated with the bottom of the incandescent bulb 49. A wire was attached to this copper bolt and attached to the plus terminal of the battery. The plus DC output of the power generator unit 42 was also attached to this positive battery terminal. The negative of the battery terminal was attached to the negative DC output of the power generator 42 unit, and also to the spring in the screw-on base of the flashlight. The whole unit fit comfortably within the housing of the original flashlight with room for extra wire lengths and some cushioning material. The normal flashlight control switch now operated as normal to short the bulb's ground side to the flashlight's ground (the spring clip and metal housing of the flashlight).

The battery lights the bright krypton flashlight bulb just as the normal three "D" size cells would. These bulbs take about 0.5 amperes of current. Ten minutes use would thus expend about 83 MAH from these batteries. The power generator used in this model produces about 6 milliamperes of charging current with moderate movement. It would thus replace the 83 MAH deficit in about 14 hours. The power generator portion of this unit should never need replacement, but the bulbs and battery may need replacement after several years. If the flashlight is stored on a boat, vehicle, in a backpack, etc. where movement is common, the battery would always be in a fully charged state. The flashlight has been in my vehicle for about one month and is frequently demonstrated, but the vehicles movement always keeps it fully charged.

LOW PROFILE POWER GENERATOR

Figure 14:
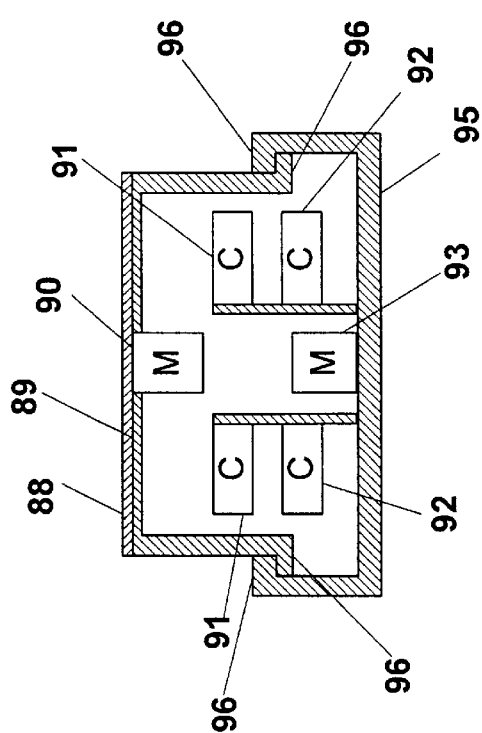
FIG. 14 shows a low profile generator such a would be used in the heel of a shoe.

Low profile power generator units would be useful in applications where strong repetitive forces are present, but where displacement may be small. Such an application is in the sole of a shoe. As a person takes a step they alternatively place and then remove tens or hundreds of pounds of force. FIG. 14 illustrates a low profile embodiment which could recover some of this lost mechanical energy and provide some cushioning as well.

As FIG. 14 shows, the low profile unit contains two magnets 90 and 93 mounted in polar opposition to create an upward force on upper magnet 90 and its housing 88 and 89. The upper housing could be constructed of two units 88 and 89 or magnet 90 could be cast within a single housing comprising 88 and 89. In the embodiment shown, the upper housing 88, 89 and the lower housing 95 are circular when viewed from top or bottom. They have tabs 96 which prevent the upper housing 88, 89 from being pushed too high or out of alignment with lower housing 95. In some fabrications, a solid circular membrane could be used to hold magnet 93 firmly in place, although solid bonding of magnet 93 into coil 92 can eliminate the need for such a membrane. As pressure is applied to the top of housing 88, pushing it and its enclosed magnet 90 into the center of coil 91, its magnetic flux creates a voltage in coil 91 and in coil 92. A release of pressure similarly induces an opposite polarity voltage in each of the coils. This induced voltage can be recovered by these units in the form of power to recharge batteries, send signals, or any of the other uses possible for low levels of power generation. The repulsive force of magnets 90 and 93 provide the springless means to return the unit to its non-stressed state (i.e., the state of having no force applied to the top of the unit.

Units of this type could be used for sensing weight changes (when used as a platform or base of the object) of some object, for detecting removal of an object (e.g., museum artifact), or simply for generating power when the unit is place in a situation where repetitive forces are often present. Such repetitive situations can occur on doorway entrance mats, roadways, or even in the heel or sole of one's shoe. Such a unit in a shoe would generate power whenever a step was taken.

I had some coils wound using #40 wire in a machined jig to create two types of coils. One was ¼ inch thick and one was ⅛ inch thick. Each was 2¾ inches outside diameter and ½ inch inside diameter. Their respective resistances were 10,300 ohms and 5,650 ohms. Their respective number of turns were 21,000 turns and 11,000 turns. To make these beautiful, but fragile coils easier to work with I soldered larger wires to the ends of the coils and encased each of them in clear fiberglass casting resin to form a solid durable unit. Many low profile coil designs are possible. Typical low profile coils would have at least about 5,000 turns per ⅛ inch of coil height and the outside diameter of the coil would be at least about 10 times larger than the height of the coil.

For the prototype embodiment of this device as shown in FIG. 14, I used a ⅛ inch coil, and inserted a ⅜ inch diameter ⅛ inch thick NdFeB disk magnet inside the center of the coil before I encased it in fiberglass to form a solid unit comprising a coil 92, and magnet 93. I did this by painting the unit with the fiberglass casting resin while the unit rested on wax paper. The upper coil 91 (with a thickness of ¼ inch) had a ¼ inch long section of 7/16 OD brass tube placed in the center of it before it was encased in fiber glass, to form a durable insert for the magnet 90 penetration. The center was then drilled and filed to form a durable smooth central bushing. Insert 94 was not used because the fiberglass casting resin firmly bound the magnet 93 in place. These two units were then cemented together to form a total package comprised of coils 91, and 92, plus magnet 93. This package was ⅜ inch thick and 3 inches in outside diameter. The two leads from the ends of coil 91 were brought out for measurement as were the two leads from coil 92 using #24 wire. These outputs were monitored on a dual trace oscilloscope as magnet 90 was brought toward and away from magnet 93. Magnet 90 was a ⅜ inch diameter, ¼ inch thick NdFeB magnet.

Almost any movement of magnet 90 within a ½ inch or so of the center of coil 91 would create several volts of output into the essentially open circuit of the oscilloscope. Moving magnet 90 very close to magnet 93 and then away would create about 20 volts out of coil 91 and about 8 volts out of coil 92. The unit was thus producing over 15 milliwatts of power each time magnet 90 was brought close or moved away from magnet 93. More study will be needed to determine how much power would be generated with normal walking, but the peak voltage values make recovery of the power from bridge rectifiers an easy task.

For the initial experiments separate outputs from coils 91 and 92 were used. The signals generated from these coils were observed to be 180 out of phase when connected similarly. That is, when measuring the signal from the outside coil wire of each coil as plus and the inside coil wire of each as negative (or vice versa). This unit could therefore be constructed in a way to have each coil signal in phase, giving just two output leads to go to a bridge rectifier, rather than a separate bridge rectifier for each coil.

Figure 15:
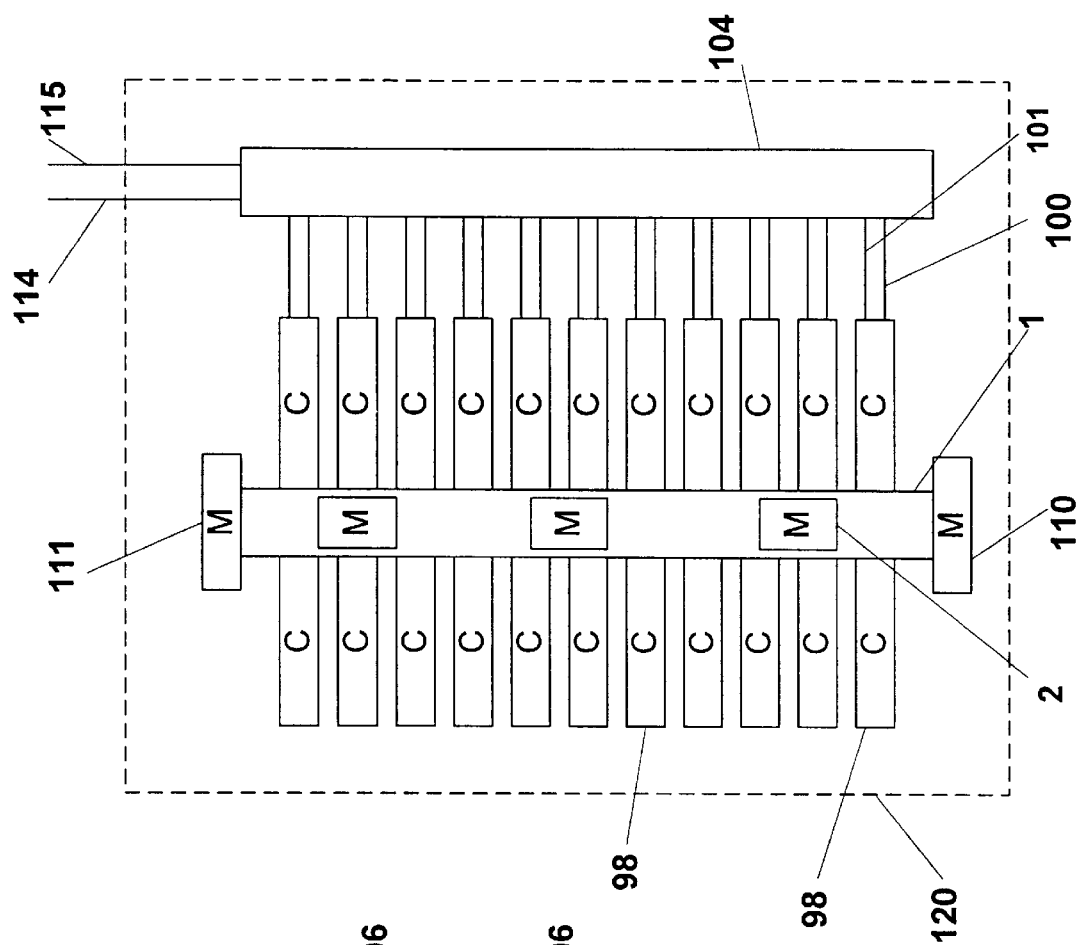
FIG. 15 describe an embodiment which utilizes very flat coils stacked to produce a relatively high power linear motion electric generator.

FIG. 15 shows an embodiment that could employ the low profile coils mentioned above to generate significant power levels by connecting in series or parallel the outputs from several of these units. In FIG. 15 three moving magnets 2 are contained in tube 1. They are suspended by polar opposition both between each other and by end magnets 110 and 111. A number of coils 98 are spaced along the outside of tube 1. Each of these coils has two outputs 100 and 101 which go to a circuit 104 (or integrated circuit) which contains separate bridge rectifiers for each coil output 100 and 101. The circuit 104 combines these rectified coil outputs in series, parallel or a combination of each to produce a DC output 114, 115 in a power condition suitable for the application. The entire unit 120 thus is a power unit with two DC outputs 114 and 115.

For example, two ¼ inch thick coils could be separated by ¼ inches for every 1 inch of tube length. With each coil generating about 10 milliwatts of power, we would be able to generate about 20 milliwatts per inch of tube, using multiple magnets as described in FIG. 3. Such higher power units could have application where size was less important than power output levels. To combine the power from such units, each coil could be connected to an integrated circuit containing separate bridge rectifiers for each coil. Because power levels are quite low for each coil a single integrated circuit could house sufficient bridge rectifiers on it to convert all coil outputs independently into DC voltages where they could then be combined on the integrated circuit chip either in series or parallel to produce the type of power necessary for a specific application. Such an integrated circuit would provide a small, compact means of converting many coil output signals into a single combined DC power output.

OTHER VARIATIONS

The above descriptions of preferred embodiments of the present invention are not intended to limit the scope of the invention. Persons skilled in the art will recognize many other variations of the present invention, the scope of which is to be determined by the following claims.

I claim:

1. A linear motion electric power generator for generation electric current from work done by an intermittent force comprising:

A) at least one moving magnet;

B) a confinement means for confining within a confinement space but permitting said at least one moving magnet to move with a bi-directional linear, or approximately linear, motion within said confinement space;

C) at least two coils, each of said two coils surrounding said confinement space, one of said at least two coils, defining a first coil, being spaced apart from another of said at least two coils, defining a second coil, and said first and said second coils being connected electrically so that current produced in said first coil as a result of movement of said at least one moving magnet is substantially in phase with current produced in said second coil as a result of the movement of said at least one moving magnet as said at least one moving magnet passes successively at least partially through said at least two coils.

2. A generator as in claim 1 wherein said at least one magnet is one magnet having a length defining a magnet length and said first coil is wound in a direction defining a first direction and said second coil is wound in a direction opposite said first direction and said first and second coils are spaced about one magnet length apart.

3. A generator as in claim 1 wherein said at least one moving magnet is an odd number of magnets, none of which are connected directly or indirectly to any other magnet.

4. A generator as in claim 1 wherein said at least one moving magnet is an odd number of magnets.

5. A generator as in claim 1 wherein said at least one moving magnet is comprised of a rare earth magnet sandwiched between two other magnets, said rare earth magnet and said two other magnets all being polarized in a single direction.

6. A generator as in claim 5 wherein said two other magnets comprise ceramic disc magnets.

7. A generator as in claim 1 wherein said at least one moving magnet is a magnet comprised of a rare earth magnet sandwiched between magnetically conductive material.

8. A generator as in claim 1 wherein said confinement means comprise a tube defining a first tube end and a second tube end and a first confining magnet located at said first tube end, said confining magnet arranged in magnetic polar opposition to one of said at least one moving magnet.

9. A generator as in claim 8 and further comprising a second confining magnet located at said second tube end and arranged in magnetic polar opposition to one of said at least one moving magnets.

10. A generator as in claim 9 wherein said first and second magnets each comprise a rare earth magnet and a non-rare earth magnet.

11. A generator as in claim 8 wherein said confinement means comprises at least one breathing hole to minimize air damping.

12. A generator as in claim 1 wherein at least one of said at least one moving magnet comprises an air passage in the form of a hole or slot to reduce air damping as it moves through said confinement space.

13. A generator as in claim 8 wherein said tube defines an inside wall and at least one of said at least one moving magnet is sized to provide a substantial clearance between itself and inside wall of said tube.

14. A flashlight comprising a light source powered by a linear motion electric power generator for generation electric current from work done by an intermittent force, said linear motion electric power generator comprising:
   A) at least one moving magnet;
   B) a confinement means for confining within a confinement space but permitting said at least one moving magnet to move with a bi-directional linear, or approximately linear, motion within said confinement space;
   C) at least two coils, each of said two coils surrounding said confinement space, one of said at least two coils, defining a first coil, being spaced apart from another of said at least two coils, defining a second coil, and said first and said second coils being connected electrically so that current produced in said first coil as a result of movement of said at least one moving magnet is substantially in phase with current produced in said second coil as a result of the movement of said at least one moving magnet as said at least one moving magnet passes successively at least partially through said at least two coils.

15. A generator as in claim 14 wherein said flashlight comprises a LED and a capacitor.

16. A generator as in claim 14 wherein said flashlight comprises a LED and a rechargeable battery.

17. A generator as in claim 1 wherein said confinement means comprises a confining magnet arranged in magnetic polar opposition to at least one of said at least one moving magnets and a boundary means for limiting movement of said moving magnetic magnet in a direction away from said confining magnetic.

18. A generator as in claim 17 wherein said at least two coils are low profile coils each coil defining a height in an axial direction and comprising at least 10,000 turns per 1/8 inch of height in the axial direction.

19. A generator as in claim 18 wherein each of said coils also define an outside diameter and said outside diameter is at least 10 times larger than said height.

20. A generator as in claim 18 wherein said generator is one of a plurality of similar generators combined to produce a compact high power unit.

21. A generator as in claim 1 wherein said at least two coils are three coils.

22. A generator as in claim 1 and further comprising an energy absorbing material mounted on said moving magnet to cushion impact caused by unusually large mechanical forces.

23. A generator as in claim 1 and further comprising an energy absorbing material mounted on said end magnets to cushion impact caused by unusually large mechanical forces.

24. A generator as in claim 1 wherein said moving magnet comprises a portion of a pendulum.

25. A shoe for generating electric power, said shoe having a heel comprising a linear motion electric power generator for generation electric current from work done by an intermittent force, said linear motion electric power generator comprising:
   A) at least one moving magnet;
   B) a confinement means for confining within a confinement space but permitting said at least one moving magnet to move with a bi-directional linear, or approximately linear, motion within said confinement space;
   C) at least two coils, each of said two coils surrounding said confinement space, one of said at least two coils, defining a first coil, being spaced apart from another of said at least two coils, defining a second coil, and said first and said second coils being connected electrically so that current produced in said first coil as a result of movement of said at least one moving magnet is substantially in phase with current produced in said second coil as a result of the movement of said at least one moving magnet as said at least one moving magnet passes successively at least partially through said at least two coils.

26. A vehicle comprising a radio device and a storage device for providing power to said radio and a generator for charging said storage device said generator being a linear motion electric power generator for generation electric current from work done by an intermittent force, said linear motion electric power generator comprising:
   A) at least one moving magnet;
   B) a confinement means for confining within a confinement space but permitting said at least one moving magnet to move with a bi-directional linear, or approximately linear, motion within said confinement space;
   C) at least two coils, each of said two coils surrounding said confinement space, one of said at least two coils, defining a first coil, being spaced apart from another of said at least two coils, defining a second coil, and said first and said second coils being connected electrically so that current produced in said first coil as a result of movement of said at least one moving magnet is substantially in phase with current produced in said second coil as a result of the movement of said at least one moving magnet as said at least one moving magnet passes successively at least partially through said at least two coils.

27. A vehicle as in claim 26 wherein said vehicle is a rail car, said storage device is a rechargeable battery and said radio device is a component of a satellite communication system.

* * * * *